United States Patent
Chen et al.

(10) Patent No.: US 10,588,138 B2
(45) Date of Patent: **\*Mar. 10, 2020**

(54) DEVICE AND METHOD FOR MULTI-INPUT MULTI-OUTPUT WIRELESS COMMUNICATION SYSTEM

(71) Applicant: SONY CORPORATION, Minato-ku (JP)

(72) Inventors: Jinhui Chen, Beijing (CN); Chen Sun, Beijing (CN); Xin Guo, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/986,062

(22) Filed: May 22, 2018

(65) Prior Publication Data

US 2018/0279329 A1    Sep. 27, 2018

Related U.S. Application Data

(63) Continuation of application No. 14/987,889, filed on Jan. 5, 2016, now Pat. No. 10,028,292.

(30) Foreign Application Priority Data

Jan. 12, 2015  (CN) .......................... 2015 1 0013424

(51) Int. Cl.
*H04W 72/12* (2009.01)
*H04B 7/0413* (2017.01)
(Continued)

(52) U.S. Cl.
CPC .......... *H04W 72/12* (2013.01); *H04B 7/0413* (2013.01); *H04B 7/0452* (2013.01); *H04B 7/0626* (2013.01)

(58) Field of Classification Search
CPC ... H04W 72/12; H04B 7/0626; H04B 7/0452; H04B 7/0413; H04B 7/06
(Continued)

(56) References Cited

U.S. PATENT DOCUMENTS

| 7,953,176 B2 * | 5/2011 | Roh ...................... H04B 7/0417 375/295 |
| 8,160,125 B2 * | 4/2012 | Clerckx ............... H04B 7/0639 375/219 |

(Continued)

OTHER PUBLICATIONS

Junjun Gao et al.; *Research Article* "Performance Evaluation of Closed-Loop Spatial Multiplexing Codebook Based on Indoor MIMO Channel Measurement", Received Jul. 23, 2012; Revised Oct. 24, 2012; Accepted Oct. 24, 2012; Hindawi Publishing Corporation—International Journal of Antennas and Propagation, vol. 2012, Article ID 701985, doi:10.1155/2012/701985, 11 pages.

*Primary Examiner* — Man U Phan
(74) *Attorney, Agent, or Firm* — Xsensus LLP

(57) ABSTRACT

A device and method for use in a MIMO wireless communication system are provided. The device used in the MIMO wireless communication system includes a matching unit configured to determine a matching degree of channel estimation information of a communication device to be scheduled with one or more reference vectors included in a reference vector group, where the reference vector group depends on an antenna array configuration of the MIMO wireless communication system; and a channel characteristic determining unit configured to determine correlation information of the one or more reference vectors with the matching degree satisfying a predetermined condition as one or more parameters reflecting channel characteristic(s) associated with the communication device. By applying the device and method according to the disclosure, it is possible to avoid interference among strong-space-correlated users, and thereby improve the efficiency of processing such as scheduling, noise reduction and so on.

20 Claims, 11 Drawing Sheets

(51) Int. Cl.
    *H04B 7/0452*     (2017.01)
    *H04B 7/06*     (2006.01)

(58) Field of Classification Search
    USPC .......................................................... 370/329
    See application file for complete search history.

(56) References Cited

U.S. PATENT DOCUMENTS

| | | | | |
|---|---|---|---|---|
| 8,498,358 | B2* | 7/2013 | Clerckx | H04B 7/0417 |
| | | | | 341/173 |
| 8,649,455 | B2* | 2/2014 | Clerckx | H04L 25/0224 |
| | | | | 375/260 |
| 8,649,456 | B2* | 2/2014 | Xia | H04B 7/0626 |
| | | | | 370/208 |
| 8,693,564 | B2* | 4/2014 | Xu | H04B 7/0663 |
| | | | | 375/260 |
| 8,953,699 | B2* | 2/2015 | Sayana | H04B 7/024 |
| | | | | 370/252 |
| 9,065,503 | B2* | 6/2015 | Liu | H04B 7/0413 |
| 9,106,466 | B2* | 8/2015 | Tosato | H04L 25/03898 |
| 9,509,377 | B2* | 11/2016 | Sayana | H04B 7/024 |
| 2009/0323849 | A1* | 12/2009 | Bala | H04B 7/0417 |
| | | | | 375/267 |
| 2011/0080964 | A1* | 4/2011 | Shamsi | H04B 7/0417 |
| | | | | 375/260 |
| 2016/0128025 | A1* | 5/2016 | Zhang | H04J 11/005 |

\* cited by examiner

DEVICE AND METHOD FOR MULTI-INPUT MULTI-OUTPUT WIRELESS COMMUNICATION SYSTEM

CROSS-REFERENCE TO RELATED APPLICATIONS

This application is a continuation of and is based upon and claims the benefit of priority Under 35 U.S.C. § 120 for U.S. Ser. No. 14/987,889, filed Jan. 5, 2016, now U.S. Pat. No. 10,028,292, and claims the benefit of priority Under 35 U.S.C. § 119 from Chinese Patent Application No. 201510013424.6, filed Jan. 12, 2015. The entire contents of which are incorporated herein by reference.

TECHNICAL FIELD

The disclosure generally relates to the wireless communication field, in particular to an apparatus for use in a multi-user Multi-Input Multi-Output (MIMO) wireless communication system and a wireless communication method.

BACKGROUND ART

The MIMO technology has become one of the key technologies of the next generation wireless communication system. Currently, the research on a point-to-point single-user MIMO system has been becoming mature. However, in the practical application, the system usually needs a base station (BS) that can communicate with a plurality of user equipments (UE) simultaneously. Therefore, the research on a point-to-multipoint Multi-user MIMO system has increasingly become the focus.

The Multi-user MIMO system is more complicated than the single-user MIMO system. Considering the fact that the application of the actual communication network will raise various questions in respect of scheduling and noise reduction, the algorithm with high complexity and high computing cost will be involved.

Taking scheduling of users in the Multi-user MIMO system as an example, the scheduling of users in the Multi-user MIMO system may be divided into a selective user scheduling algorithm and a non-selective user scheduling algorithm. Exhaust algorithm and greedy search algorithm in the selective user scheduling algorithm have better performance, but at a cost of high complexity. When the number of antennas or users is large, the problem that the scheduling of users cannot be completed in time or the cost of computing devices is high may be caused due to its high complexity. The non-selective user scheduling algorithm such as a Round-Robin scheduling algorithm and a random scheduling algorithm may result in bad performance of the scheduling, thus fail to meet the system requirement.

SUMMARY OF THE INVENTION

According to one aspect of the present disclosure, there is provided a device for use in a Multi-Input Multi-Output MIMO wireless communication system, comprising: a matching unit configured to determine a matching degree of channel estimation information of a communication device to be scheduled with one or more reference vectors included in a reference vector group, wherein the reference vector group depends on an antenna array configuration of the MIMO wireless communication system; and a channel characteristic determining unit configured to determine correlation information of the one or more reference vectors with the matching degree satisfying a predetermined condition as one or more parameters reflecting channel characteristic(s) associated with the communication device.

According to another aspect of the present disclosure, there is provided a wireless communication method for a Multi-Input Multi-Output MIMO wireless communication system, the method comprising: determining a matching degree of channel estimation information of a communication device to be scheduled with one or more reference vectors included in a reference vector group, wherein the reference vector group depends on an antenna array configuration of the MIMO wireless communication system; and determining correlation information of the one or more reference vectors with the matching degree satisfying a predetermined condition as one or more parameters reflecting channel characteristic(s) associated with the communication device.

According to one aspect of the present disclosure, there is provided a device for use in a Multi-Input Multi-Output MIMO wireless communication system, comprising one or more processors configured to implement a method comprising: determining a matching degree of channel estimation information of a communication device to be scheduled with one or more reference vectors included in a reference vector group, wherein the reference vector group depends on an antenna array configuration of the MIMO wireless communication system; and determining correlation information of one or more reference vectors with the matching degree satisfying a predetermined condition, as one or more parameters reflecting channel characteristic(s) associated with the communication device.

According to another aspect of the present disclosure, there is provided a device for user in a Multi-Input Multi-Output MIMO wireless communication system, comprising: a receiving unit configured to receive configuration information of an antenna array; and a generating unit configured to generate a reference vector group based on the configuration information.

According to another aspect of the present disclosure, there is provided a device for use in a Multi-Input Multi-Output MIMO wireless communication system, comprising one or more processors configured to implement a method comprising: acquiring configuration information of an antenna array; and generating a reference vector group based on the configuration information.

According to another aspect of the present disclosure, there is provided a non-transitory computer readable storage device having instructions stored therein that when executed by processing circuitry perform a communications method, the method comprising: determining a matching degree of channel estimation information of a communication device to be scheduled with one or more reference vectors included in a reference vector group, wherein the reference vector group depends on an antenna array configuration of the MIMO wireless communication system; and determining correlation information of one or more reference vectors with the matching degree satisfying a predetermined condition, as one or more parameters reflecting channel characteristic(s) associated with the communication device.

The application of the device used in the MIMO wireless communication system and the wireless communication method according to the present disclosure can avoid interference among transmissions of strong-space-correlated users, and thus improve the efficiency of processing such as scheduling and noise reduction and so on.

BRIEF DESCRIPTION OF THE DRAWINGS

With reference to the following description of the embodiments of the present disclosure in connection with accompanying drawings, the above and other purposes, characteristics and advantages of the present disclosure will become apparent. In the drawings, the same or corresponding technical features or components will be indicated by the same or corresponding reference signs. In the drawings, the sizes and relative positions of the units are not necessarily drawn in proportion.

DESCRIPTION OF EMBODIMENTS

The embodiments of the present disclosure will be illustrated with reference to the accompanying drawings. It should be noted that expressions and descriptions of components and processing independent of the present disclosure and known to those skilled in the art are omitted for the sake of clearness.

In regard to the user scheduling in the Multi-user MIMO system, a method is aim to maximize the throughput of the system. That is, information is sent to the user when the user channel capacity reaches the maximum. It is required to consider which user equipment in the network can be combined together at a certain time for simultaneous communication. Space division multiple access may be used in the same user group while other access modes may be used among different groups. Therefore, it is also required to consider spatial correlation between the users. In addition, it is required to seek out a compromise between effectiveness and fairness according to the characteristics and requirements of the communication system. Hence, one of the objects of the present disclosure is to provide a technology capable of avoiding interference among transmissions of the strong-space-correlated users, so as to make scheduling and noise reduction with high efficiency and low cost possible.

Figure 1:
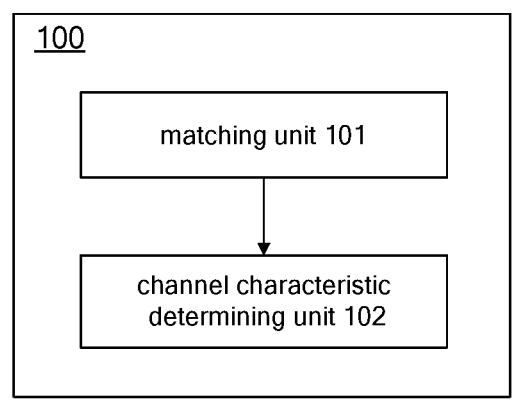
FIG. 1 is a block diagram illustrating a structure of a device for use in a MIMO wireless communication system according to the embodiment of the present disclosure.

FIG. 1 is a block diagram illustrating a structure of a device 100 for use in a MIMO wireless communication system according to the embodiment of the present invention. The device 100 comprises a matching unit 101 and a channel characteristic determining unit 102. The matching unit 101 is configured to determine a matching degree between channel estimation information of a communication device to be scheduled and a reference vector included in a reference vector group.

The channel estimation information of the communication device may be long-term channel statistics information, e.g., but not limited to, space covariance matrix estimation. Or, the channel estimation information may also be real-time channel state information, e.g., but not limited to, real-time channel state estimation.

The reference vector group is concerned with antenna array configurations of the MIMO wireless communication system. The reference vector group and the antenna array configuration information can be stored in a storage device (e.g., as a reference vector database) in advance in association with each other so that the device 100 may perform search.

For example, in a specific example, the communication device transmits a channel training sequence to the device 100. The device 100 estimates channel information by receiving the channel training sequence. In addition, an antenna array side of the base station configured with e.g. an antenna array transmits antenna array configuration status to the device 100. The device 100 selects a group of reference vectors from a reference vector database according to the antenna array configurations. Here, the antenna array configuration status at least comprises a number of antennas. Besides, the antenna array configuration status may also comprise a geometrical shape of the antenna array and the like.

In one example, the reference vector group may comprise a plurality of reference vectors orthogonal to one another. The plurality of reference vectors correspond to a plurality of mutually orthogonal virtual channel vectors of the antenna array. For example, in a scene of M antennas, the reference vector group can be constructed to include M orthogonal vectors. In another example, the reference vector group may comprises a plurality of reference vectors, wherein the plurality of reference vectors correspond to a plurality of virtual channel vectors of the antenna array in a maximum antenna gain direction, but not always orthogonal to one another. In this example, in the scene of M antennas, as the maximum antenna gain direction may be less than M, the constructed reference vector group does not necessarily comprise M vectors, which are not necessarily orthogonal to one another completely.

Hereinafter, a method of determining a matching degree between channel estimation information of a communication device to be scheduled and a reference vector included in a reference vector group by the matching 101 will be described. The method of determining a matching degree described here is only exemplary. Those skilled in the art may determine the matching degree in various manners as appropriate.

In one example, for the user k, when a space covariance matrix estimation $R_k$ is used as channel information, a matching value $\lambda_{m,k}$ corresponding to the reference vector $a_m$ can be obtained by an equation (1):

$$\lambda_{m,k} = a_m^H R_k a_m \quad (1)$$

Wherein, $a_m$ is a column vector of length of M, $R_k$ is a M×M Hermitian matrix, and M is a number of antenna elements at a center node.

In another example, for the user k, when a space covariance matrix estimation $R_k$ is used as channel information, a matching value $\lambda_{m,k}$ corresponding to the reference vector $a_m$ can be obtained by an equation (2):

$$\lambda_{m,k}=|a_m^H v_k|^2 \quad (2)$$

Wherein, $v_k$ is a characteristic vector corresponding to the maximum characteristic value of $R_k$.

In another example, for the user k, when a space covariance matrix estimation $R_k$ is used as channel information, a matching value $\lambda_{m,k}$ corresponding to the reference vector $a_m$ can be obtained by an equation (3):

$$\lambda_{m,k}=|a_m^H h_k|^2 \quad (3)$$

Wherein, $h_k$ and $a_m$ are column vectors of length of M, and M is a number of antenna elements at a center node.

The channel characteristic determining unit 102 is configured to determine correlation information of the reference vector when the matching degree between the channel estimation information of the communication device to be scheduled and the reference vector included in the reference vector group satisfies a predetermined condition, as a parameter reflecting a channel characteristic of the communication device. Here, the predetermined condition can be determined according to system design. The correlation information of the reference vector when the matching degree satisfying the predetermined condition, as the parameter reflecting the channel characteristic, may include, for example, identification information of the corresponding reference vector, a similarity degree between the channel estimation information and the reference vector (e.g., a correlation value of the channel estimation information and the reference vector), and so on.

In addition, in one example, the channel characteristic determining unit 201 may be configured to use the reference vector when the matching degree between the channel estimation information of the communication device to be scheduled and the reference vector included in the reference vector group is greater than a predetermined threshold, as a representative vector of the communication device for specific transmission resources, so that the parameters representing the channel characteristic of the communication device comprises the representative vector. In other words, correlation information of the reference vector when the matching degree satisfying a predetermined condition, as a parameter of the channel characteristic, may include the reference vector itself.

In the above example, the number of representative vectors may be zero, one or plural. The direction of the representative vector of the communication device for specific transmission resource may be defined as a primary direction of the communication device for the specific transmission resources, while directions corresponding to other reference vectors may be defined as secondary directions. Each communication device has zero, one or more primary directions on the specific transmission resources. The channel having no representative vector is considered as a no-primary direction channel. The interference caused by data transmissions on the no-primary direction channel for other user channels can be omitted. When determining the primary direction (i.e., the representative vector) of the communication device, the same threshold or different thresholds can be used for each communication device. Assumed that some communication device has a primary direction $D_{primary}=[1]$ and $D_{secondary}=[2, 3]$, wherein 1, 2 and 3 are serial numbers of the direction, rather than the reference vector per se. Then, in this example, the parameters as the channel characteristic may also include, but not limited to, primary direction $D_{primary}=[1]$ only, or primary direction and secondary directions $D=[1, 2, 3]$, or primary direction and a similarity degree of the primary direction, or primary direction and secondary direction and weights in the primary and secondary directions.

The parameters of the channel characteristic of the communication device obtained by device 100 can reflect spatial correlation between the communication devices in a clean and straightforward manner, thus providing the possibility of further implementing low-cost and high-efficiency scheduling and noise reduction. More specifically, in the traditional technology, the channel estimation information is used as complete representation of the user channel. Although the spatial correlation between the users may be calculated by comparing the channel estimation information, the process is very complicated, and the calculation cost is relatively high. The device and method of the present disclosure may use a simple (relatively rough) method to determine the strong-space-correlated users, thereby reducing the calculation cost and complexity degree.

Figure 2:
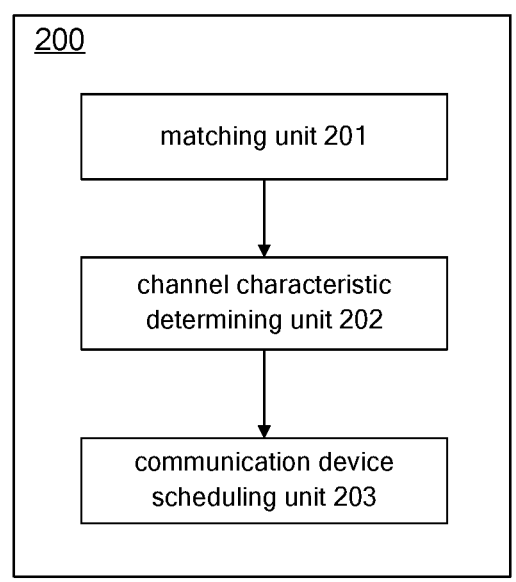
FIG. 2 is a block diagram illustrating a structure of a scheduling device for use in a MIMO wireless communication system according to the embodiment of the present disclosure.

FIG. 2 is a block diagram illustrating a structure of a scheduling device 200 for use in a MIMO wireless communication system according to the embodiment of the present disclosure. The scheduling device 200 comprises: a matching unit 201, a channel characteristic determining unit 202 and a communication device scheduling device 203, wherein the matching unit 201 and the channel characteristic determining unit 202 have the same function and structure as those of the matching unit 101 and the channel characteristic determining unit 102 as described with reference to FIG. 1. Detailed description will be omitted here. The channel characteristic determining unit 202 provides the obtained parameter reflecting the channel characteristic of the communication device for the communication device scheduling device 203. The communication device scheduling device 203 then schedules one or more of the plurality of communication devices based on the channel characteristics of the plurality of communication devices to be scheduled. For example, the communication device scheduling device 203 may schedule, with respect to specific transmission resource, the ones among the plurality of communication devices whose differences in channel characteristic satisfy a predetermined condition to perform transmission. For example, the communication device scheduling device 203 can schedule the ones among the plurality of communication devices whose differences in channel characteristic are relatively larger to perform transmission.

As can be seen from the above description of the reference vector, when the channel characteristics of the communication devices have a higher matching degree with different reference vectors in the reference vector group, respectively, differences between these channel characteristics are greater. Therefore, in one example, the communication device scheduling unit 203 is configured to schedule communication devices that have no identical representative vector or have less identical representative vectors to perform transmission on the specific transmission resource, in a case where the channel characteristic determining unit 202 uses the reference vector when the matching degree being greater than a predetermined threshold as the representative vector of the communication device for the specific transmission resource.

The predetermined threshold, as a criterion for determining the matching degree, may be set in association with at least one of a channel gain, a scheduling requirement for each communication device to be scheduled and a fairness principle.

The following text will explain a specific operation of the scheduling device 200 according to the embodiment of the disclosure in a simple example. In a specific example, in a TDD and OFDM-modulated wireless communication cellular system, the base station device performs a long-term scheduling on user equipments within the cell by using covariance matrix information corresponding to the user channel on the nth resource block. The base station device is installed with a uniform linear array formed by M antennas. The cell totally has k active single-antenna users. The reference vector group corresponding to the uniform linear array formed by M antennas is M DFT (discrete Fourier transform) vectors $a_m$ as illustrated in the following equation, $$a_m = \frac{1}{\sqrt{M}}[1, e^{j\psi_m}, \ldots, e^{j(M-1)\psi_m}]^T, \psi_m = \frac{2\pi m}{M}, m = 0, \ldots, M-1. \quad (4)$$

The covariance matrix estimation on the nth resource block corresponding to the user equipment k is represented by $R_{k,n}$, and thus the matching value $\lambda_{m,k,n}$ corresponding to the reference vector $a_m$ is calculated as $$\lambda_{m,k,n} = a_m^H R_{k,n} a_m \quad (5).$$

Assuming a threshold of σ, for $\lambda_{m,k,n}$ greater than σ, m is recorded as a primary direction index number corresponding to the channel of the user k on the source block n.

A user with such corresponding primary direction is searched from m=0, and m is sequentially increased until m=M−1. If there are a plurality of users who take the primary direction with the same index number m as one of the primary directions, the primary user with the maximum corresponding value $\lambda_{m,k,n}$ is selected therefrom and scheduled, and the remaining users are marked as users who are not scheduled, thus preventing the strong-space-correlated users from being scheduled to the same transmission resource, and further reducing the interference and improving the transmission efficiency. In another example, if there are a plurality of users who take the primary direction with the same index number m as one of the primary directions, the primary user with the maximum corresponding value $w_k \lambda_{m,k,n}$ is selected therefrom and scheduled, and the remaining users are marked as users who are not scheduled. Here, $w_k$ is a scheduling weight for the user. For example, it depends on a scheduling priority of the user (e.g., related to the service type), and scheduling requirement (e.g., related to the waiting scheduling time). In addition, in another example, the threshold σ is set relatively low, so the user k has multiple primary directions m, b and c, and the multiple primary directions are then arranged in a descending order according to the matching values corresponding to the corresponding reference vectors. For instance, the channel estimation for user k has the maximum matching value with the reference vector $a_m$, only the users who take the primary direction with the same index number m as a primary direction and arrange the same in the first place among a plurality of primary directions will be considered. Then schedule is performed in accordance to the above two examples. Those skilled in the art could design other simple variants based on the above examples, which are not illustrated herein.

In the above example, the reference vector {am} is constructed in accordance to M virtual channel vectors of the antenna array which are orthogonal to one another. Alternatively, the plurality of reference vectors in the reference vector group correspond to virtual channel vectors of the antenna array comprising M antenna elements in a plurality of maximum antenna gain directions. For example, the plurality of maximum antenna gain directions is determined by experiments or trainings in advance, and then the reference vectors are constructed accordingly. The vectors included in the reference vector group constructed in such a manner do not orthogonal to one another completely, and the number of the vectors is less than M.

Figure 3:
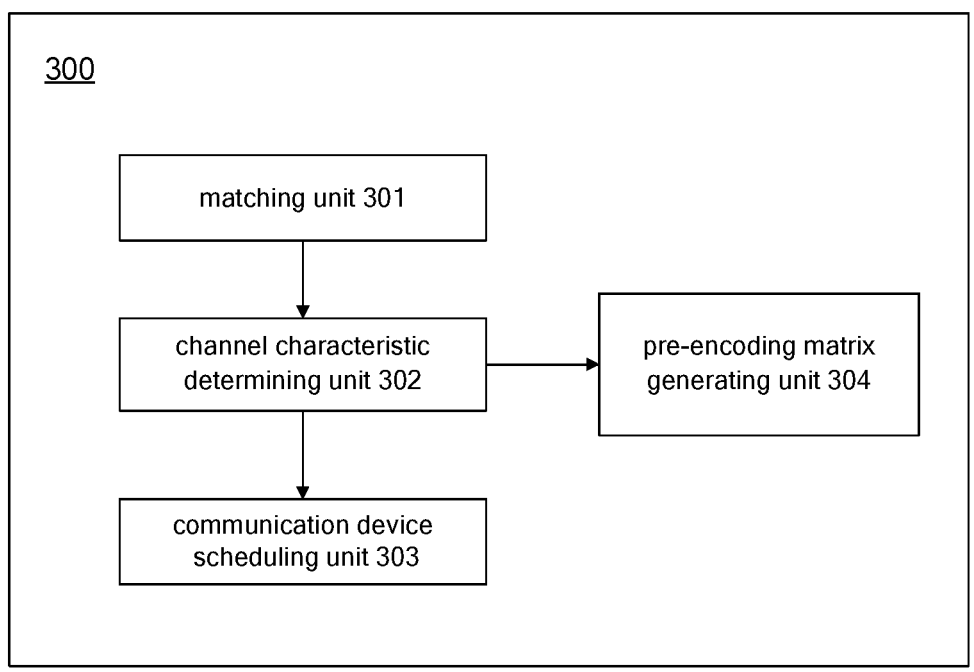
FIG. 3 is a block diagram illustrating a structure of a scheduling device for use in a MIMO wireless communication system according to another embodiment of the present disclosure.

FIG. 3 is a block diagram illustrating a structure of a scheduling device 300 for use in a MIMO wireless communication system according to another embodiment of the present disclosure. The scheduling device 300 comprises: a matching unit 301, a channel characteristic determining unit 302, a communication device scheduling unit 303 and a pre-encoding matrix generating unit 304, wherein the matching unit 301 and the channel characteristic determining unit 302 have the same function and structure as those of the matching unit 201 and the channel characteristic determining unit 202 as described with reference to FIG. 2. Detailed description will be omitted here.

In a preferred example, like the corresponding description for FIG. 2, the communication device scheduling unit 303 schedules communication devices having different representative vectors to perform transmission on the specific transmission resource. The pre-encoding matrix generating unit 304 generates a pre-encoding matrix based on channel estimation information of the communication devices in the conventional manner for example. For example, a channel matrix constructed by using channels of the communication devices which are scheduled to perform transmission on the same time-frequency resource is subjected to a zero-forcing algorithm, and thus a pre-encoding matrix is obtained.

In an optional example, in a case where the channel characteristic determining unit 302 takes a reference vector having a matching degree greater than the predetermined threshold as the representative vector of the communication devices for specific transmission resource, and the communication device scheduling unit 303 schedules the communication devices having identical representative vectors to perform transmission on the specific transmission resource, the pre-encoding matrix generating unit 304 may be configured to calculate a pre-encoding matrix for the communication devices having identical representative vectors based on the channel characteristics, so as to reduce interference to the communication devices having identical representative vectors. In the example in which the communication device has a plurality of representative vectors, the scheduling unit 303 may also schedule the communication devices having partial identical representative vectors (i.e., a case where the representative vectors are overlapped), and the pre-encoding matrix generating unit 304 may be configured to calculate a pre-encoding matrix for the communication devices having the overlapped representative vectors based on the channel characteristics, so as to reduce interference to the communication devices having the overlapped representative vectors.

The specific calculation method of the pre-encoding matrix generating unit 304 of the scheduling device 300 according to the embodiment of the disclosure is described in a simple example as follows. The pre-encoding matrix generating unit 304 may calculate the pre-encoding matrix using any methods according to the requirement of the system.

In one specific example, assuming two users, i.e., user 0 and user 1, and assuming that the base station has eight antennas and the corresponding reference vector is $\{v_m\}_{m=0,\ldots,7}$, the representative vector corresponding to the downlink channel vector $h_0$ of user 0 is $D_0=[1,2,3]$, and the corresponding weight is $\{w_{0,1}, w_{0,2}, w_{0,3}\}$. A representative vector corresponding to the downlink channel vector $h_1$ of user 1 is $D_1=[3,4,5]$, and the corresponding weight is $\{w_{1,3}, w_{1,4}, w_{1,5}\}$. Wherein, the weight is represented by a matching value with the corresponding reference vector for example. Assuming $w_{0,3} > w_{1,3}$, the pre-encoding submatrix corresponding to the user channel $h_0$ is $p_0 = h_0^H$, and the pre-encoding submatrix corresponding to the user channel $h_1$ is $p_1 = (I - v_3 v_3^H) h_1^H$. Wherein, I is a unit matrix having the same number of dimensions as $V_3 V_3^H$. The pre-encoding matrix employed by the base station (and constructed by the pre-encoding matrix generating unit 304) is $$p = \frac{[p_0, p_1]}{\|[p_0, p_1]\|}. \tag{6}$$

Next, a principle of constructing a pre-encoding matrix by using the equation (6) is simply explained. There exists interference between user 0 and user 1 because both of them use vector 3 as the representative vector. As user 0 has a larger weight on the representative vector 3, user 0 can hold the representative vector 3. User 1 evades direction 3 by projecting the pre-encoding matrix onto an orthogonal space corresponding to the representative vector 3, thereby avoiding interference to user 0.

In the example described with reference to FIG. 3, scheduling of the communication devices is performed by using parameters reflecting channel characteristics of the communication devices determined by the channel characteristic determining unit 302, and pre-encoding is performed for data transmission of the communication devices that are scheduled in this manner. Thus, the scheduling efficiency is improved, and the transmission interference between the communication devices having identical representative vectors is reduced. In another embodiment, pre-encoding is also performed by using parameters reflecting channel characteristics of the communication devices determined by the channel characteristic determining unit 302 for data transmission of the communication devices scheduled in accordance to traditional scheduling methods, thus reducing the transmission interference between the communication devices.

Figure 4:
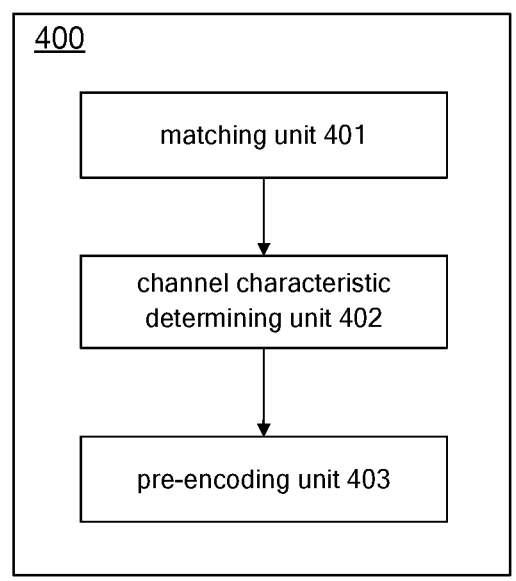
FIG. 4 is a block diagram illustrating a structure of a scheduling device for use in a MIMO wireless communication system according to another embodiment of the present disclosure.

FIG. 4 is a block diagram illustrating a structure of a scheduling device 400 for use in a MIMO wireless communication system according to another embodiment of the present disclosure. The scheduling device 400 comprises: a matching unit 401, a channel characteristic determining unit 402 and a pre-encoding unit 403, wherein the matching unit 401 and the channel characteristic determining unit 402 have the same function and structure as those of the matching unit 101 and the channel characteristic determining unit 102 as described with reference to FIG. 1. Detailed description will be omitted here. For a plurality of communication devices to be scheduled simultaneously, the pre-encoding unit 403 can perform pre-encoding on the transmission data of the scheduled communication devices based on the channel characteristics of the plurality of communication devices. Specifically, the pre-encoding unit 403 may perform pre-encoding processing by using the pre-encoding matrix calculated in the same way as the pre-encoding matrix generating unit 304 (or the pre-encoding matrix generated by the pre-encoding matrix generating unit is directly used in the scheduling device 400), thus eliminating the interference between the communication devices. The detailed description is omitted here.

Figure 5:
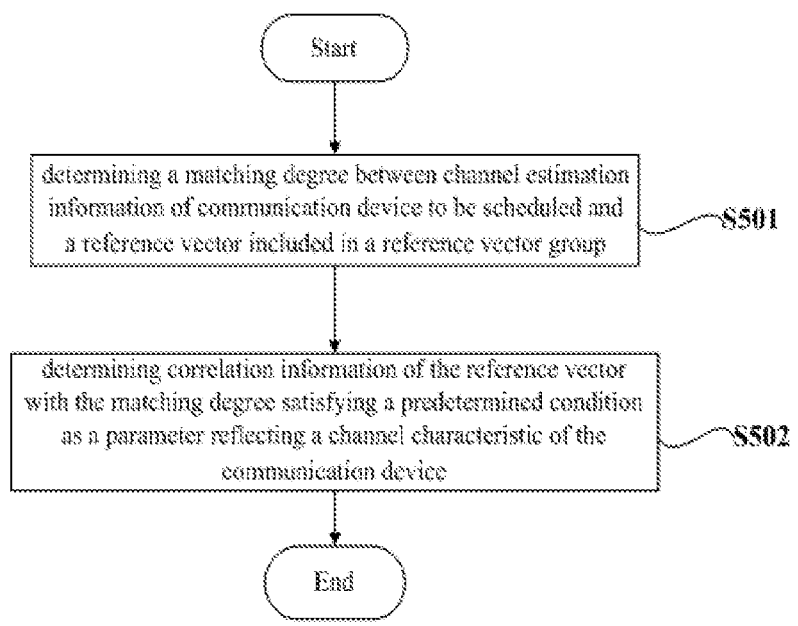
FIG. 5 is a flow chart illustrating a wireless communication method for use in a MIMO wireless communication system according to the embodiment of the present disclosure.

FIG. 5 is a flow chart illustrating a wireless communication method for use in a MIMO wireless communication system according to the embodiment of the present disclosure. The wireless communication method can be used by e.g. device 100 described in connections with FIG. 1. In step S501, a matching degree between the channel estimation information of the communication device to be scheduled and the reference vector included in the reference vector group is determined. Here, the channel estimation information may either be long-term channel statistics information or channel status information. The reference vector group is associated with antenna array configuration of the MIMO wireless communication system. In one example, the reference vector group may include a plurality of reference vectors which are orthogonal to one another, wherein the plurality of reference vectors corresponds to a plurality of virtual channel vectors of the antenna array which are orthogonal to one another. In another example, the reference vector group may include a plurality of reference vectors, wherein the plurality of reference vectors correspond to virtual channel vectors of the antenna array in a plurality of maximum antenna gain directions.

In one embodiment, a reference vector with the matching degree greater than a predetermined threshold is determined as a representative vector of the communication device for the specific transmission resource, and further as a parameter reflecting the channel characteristic of the communication device.

In step S502, correlation information of the reference vector with the matching degree satisfying a predetermined condition is determined as a parameter reflecting a channel characteristic of the communication device.

The specific operation example of the method as shown in FIG. 5 has been described in detail in connection with FIG. 1, thus the description is omitted here. When the parameter reflecting the channel characteristic of the communication device is obtained using the method described in FIG. 5, scheduling of the communication device and elimination of the interference can be performed based on the parameter as described above. A specific example will be described in connection with FIG. 6 as follows.

Figure 6:
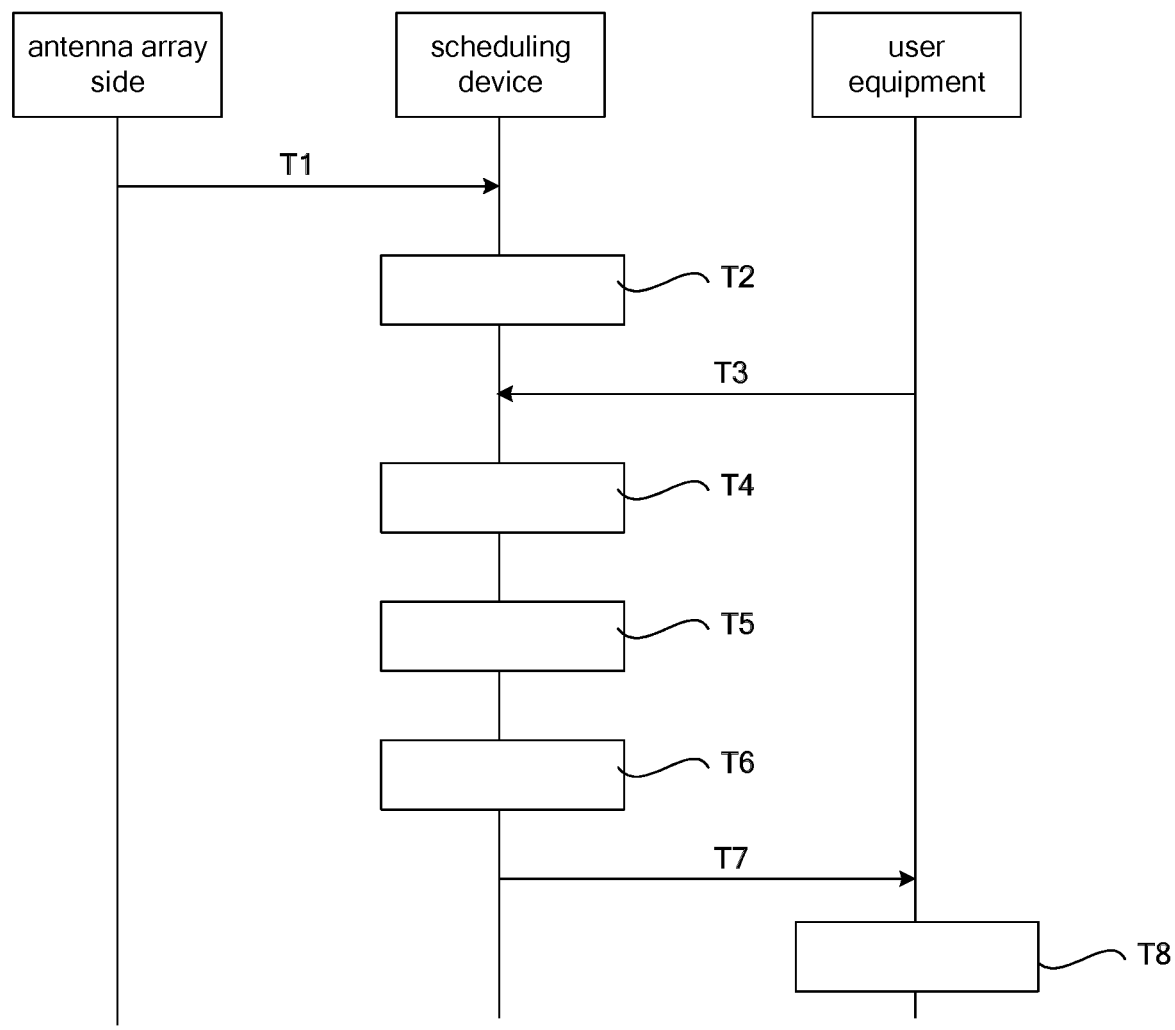
FIG. 6 is a timing chart illustrating a specific example of a wireless communication method for use in a MIMO wireless communication system according to the embodiment of the present disclosure.

FIG. 6 is a timing chart illustrating a specific example of a wireless communication method for use in a MIMO wireless communication system according to the embodiment of the present disclosure. The wireless communication method according to the embodiment of the present disclosure is not limited to the embodiment. For example, but not limited to, the sequence executed in some steps in FIG. 6 can be changed as appropriate, or some steps can be omitted or executed in parallel.

As shown in FIG. 6, in operation T1, an antenna array side transmits configuration information of an antenna array to the scheduling device according to the embodiment of the present disclosure. According to application scenarios, the antenna array side may be, e.g., RRH configured with an antenna array, a relay station, or a primary user equipment configured with an antenna array in a Device-to-Device scenario. The antenna array side of the embodiment of the present disclosure is a transmitting side or a receiving side for data transmission, and the scheduling processing may include forward/downlink scheduling and backward/uplink scheduling. The configuration information of the antenna array may include: information on the number of antennas, geometric shape information of the antenna array, etc. The scheduling device according to the embodiment of the present disclosure can be disposed separately from the antenna array side (for example, eNB having a scheduler performs transmission control for the RRH having the antenna array), or can be integrated with the antenna array side (for example, eNB having an antenna array and a scheduler performs transmission control for the antenna array thereof). In the example that the scheduling device and the antenna array side are disposed separately, operation T1 is executed through the corresponding communication interface. In the example that the scheduling device and the antenna array side are integrated into a whole, operation T1 is executed through e.g. RF cables. In addition, in operation T1, instead of the configuration information of the antenna array, the antenna array side may transmit identification information such as a serial number of the antenna array side to the scheduling device, and the scheduling device may retrieve the corresponding configuration information of the antenna array from a pre-stored database.

After the scheduling device receives the configuration information of the antenna array, in operation T2, the scheduling device may select a reference vector group based on the corresponding configuration information.

In operation T3, the user equipment (as an example of the "communication device") transmits to the scheduling device a channel training sequence, for example, a Sounding Reference Signal in an LTE system, and other pilot signals.

In operation T4, the scheduling device estimates channel information of the user equipment based on the received channel training sequence. The channel information may either be real-time channel status information or long-term channel statistics information.

After the reference vector group is determined and the channel information is estimated, in operation T5, the scheduling device determines a matching degree between them. The method of determining a matching degree has been described exemplarily in the above, so the description is omitted here. The matching degree can reflect the channel characteristic of the user equipment. In other words, when the matching degree satisfies a predetermined condition, correlation information of the corresponding reference vector can reflect the channel characteristic of the user equipment.

In operation T6, user equipment to be scheduled to perform transmission on the same transmission resource can be selected based on the obtained channel characteristic. For example, the ones among the plurality of communication devices whose differences in channel characteristic satisfy a predetermined condition may be selected. In a case where the reference vector with a matching degree greater than a predetermined threshold is used as a representative vector of the user equipment for the specific transmission resource and further used as a parameter reflecting the channel characteristic of the communication device, user equipments that have no identical representative vector or have relatively less identical representative vectors may be selected to perform transmission on the specific transmission resource. Here, the predetermined threshold is set in association with at least one of a channel gain, a scheduling requirement for each communication device to be scheduled, and a fairness principle.

In operation T7, the scheduling device transmits scheduling information to the user equipment selected in operation T6.

In operation T8, the user equipment receives scheduling information from the scheduling device and initiates the corresponding data transmission. Specifically, the user equipment may perform downlink reception and uplink transmission respectively based on whether the scheduling information is downlink scheduling information or uplink scheduling information.

Although it is not shown in FIG. 6, the wireless communication method according to the embodiment of the present disclosure may also perform pre-encoding on transmission data of the scheduled communication devices based on channel characteristics of a plurality of communication devices scheduled simultaneously, so as to reduce interference among the communication devices. The same process applies to the communication devices scheduled by using traditional scheduling methods. In addition, in a case where the scheduling method according to the embodiment of the present disclosure is used and communication devices having identical representative vectors are scheduled to perform transmission on the specific transmission resource, a pre-encoding matrix for the communication devices having identical representative vectors can be calculated based on the channel characteristics, so as to reduce interference among the communication devices having identical representative vectors.

The wireless communication method in the Multi-Input Multi-Output (MIMO) wireless communication system according to the embodiment of the present disclosure as described above may be performed by one or more processors of a device.

Figure 7:
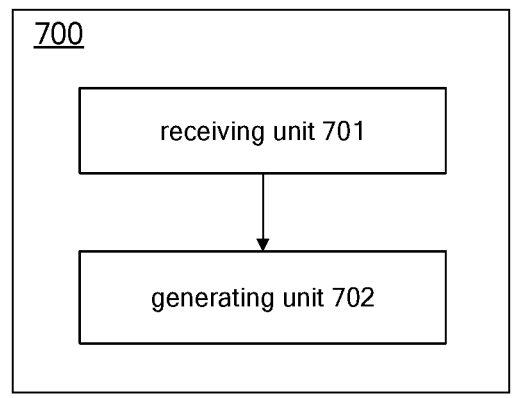
FIG. 7 is a block diagram illustrating a structure of a device for generating a reference vector according to the embodiment of the present disclosure.

FIG. 7 is a block diagram illustrating a structure of a device 700 for use in a MIMO wireless communication system according to the embodiment of the present disclosure. The device 700 comprises a receiving unit 701 and a generating unit 702, wherein the receiving unit 701 is used for receiving configuration information of an antenna array, the generating unit 702 is used for generating a reference vector group based on configuration information. Reference vectors in the reference vector group generated by the generating unit 702 may be e.g. orthogonal to one another, or correspond to respective maximum antenna gain directions of the antenna array respectively.

In one embodiment, the generating unit 702 may generate a reference vector group based on at least information on the number of antennas in the configuration information. The number of dimensions of the reference vectors in the reference vector group may be equal to the number of antennas. In another embodiment, the generating unit 702 may also generate a reference vector group based on information relating to the geometrical shape of the antenna array in the configuration information. A processing of generating a reference vector group by the generating unit 702 based on the antenna configuration information is described as follows.

In one example, for a uniform linear antenna array formed by M antenna elements having identical polarization direction, the generating unit 702 may generate M reference vectors which are orthogonal to one another. Here, each reference vector may be a DFT vector. That is, reference vector $r_m$ is in a form as shown in equation (7):

$$r_m = \frac{1}{\sqrt{M}}\left[1, \ldots, e^{\frac{j2\pi(i-1)m}{M}}, \ldots, e^{\frac{j2\pi(M-1)m}{M}}\right]^T, \quad (7)$$

wherein m is a serial number of the reference vector, and i is a location number of a element constituting the vector component.

In another example, in a scenario of a clustered linear antenna array formed by a uniform arrangement of M/2 antenna clusters, assuming that each antenna cluster is consisted of a pair of antenna elements whose polarization directions are orthogonal to each other, and that the antenna array is divided into two groups of common-polar subarrays according to the polarization direction, the generating unit may generate M reference vectors, so that each reference vector of a length of M is consisted of two groups of DFT vectors, which are orthogonal to each other and each of which has a length of M/2. That is, reference vector $r_m$ is in a form as shown in equation (8):

$$r_m = \begin{cases} \frac{1}{\sqrt{2M}}[p_m, e^{j\alpha}q_m]^T, 0 \leq m \leq \frac{M}{2} - 1; \\ \frac{1}{\sqrt{2M}}[p_{m-\frac{M}{2}}, -e^{j\alpha}q_{m-\frac{M}{2}}]^T, \frac{M}{2} \leq m \leq M - 1 \end{cases} \quad (8)$$

wherein m is a serial number of the reference vector, $\alpha$ is a non-negative real number with a value between 0 and $2\pi$, and $p_m$ and $q_m$ are sub-reference vectors respectively. For example, a M×M/2 matrix formed by arranging sub-reference vectors $p_m$ in order may be a matrix formed by arranging sub-reference vectors $q_m$ in order or commutation of the matrix.

In another example, for a uniform planar antenna array formed by M×N antenna elements having identical polarization direction, there are M×N reference vectors of a length of M×N. Wherein, each reference vector $r_{m,n}$ is a Kronecker product of two DFT vectors $r_m$ and $r_n$ as shown in equation (7) which have lengths M and N respectively. That is, reference vector $r_{m,n}$ is in a form as shown in equation (9):

$$r_{m,n} = r_m \otimes r_n \quad (9),$$

Wherein $r_m$ and $r_n$ are DFT vectors calculated according to equation (7).

In another example, for a clustered planar antenna array formed by a uniform arrangement of M/2×N antenna clusters each of which is consisted of a pair of antennal elements which are orthogonal to each other in polarization directions, the antenna array is divided into two groups of common-polar subarrays according to the polarization direction. There are M×N reference vectors of a length of M×N. Each reference vector $r_{m,n}$ is a Kronecker product of a DFT vector $r_m$ having a length of M calculated according to equation (8) and a DFT vector $r_n$ having a length of N calculated according to equation (7).

The present invention is described above with reference to the flow charts and/or block diagrams of methods and devices according to the embodiments of the present invention. It should be noted that expressions and descriptions of components and processes which are irrelevant to the present invention and known to those skilled in the art are omitted in the drawings and description for the sake of clarity. Each block of the flow chart and/or block diagram as well as a combination of various blocks of the flow chart and/or block diagram can be implemented by computer instructions. The computer instructions may be provided to general purpose computers, special purpose computers or other processors of programmable data processing devices. Thereby, a machine can be produced so that these instructions executed by a computer or other programmable data processing devices can produce a device for implementing functions/operations specified in the blocks of the flow chart and/or block diagram.

These computer program instructions may also be stored in a computer-readable medium capable of instructing a computer or other programmable data processing devices to operate in a particular way. In this way, the instructions stored in the computer-readable medium generate a manufacture comprising an instruction means for implementing functions/operations specified in the blocks of the flow chart and/or block diagram.

These computer program instructions may also be loaded onto a computer or other programmable data processing devices, so that a series of operation steps are executed on the computer or other programmable data processing devices to generate a computer-implemented process, and thereby the instructions executed on the computer or other programmable devices may provide a process for implementing the functions/operations specified in the blocks of the flow chart and/or block diagram.

It should be understood that the flow charts and block diagrams illustrate system architecture, function and operation that may be implemented by the system, method and computer program product according to various embodiments of the present invention. On this point, each block of the flow chart or the block diagram represents a module, a program segment, or a part of codes. The module, the program segment, or the part of codes includes one or more executable instructions for implementing the specified logic functions. It should also be noted that, in some alternative implementations, functions marked in the blocks may also be implemented in an order which is different from that marked in the drawing. For example, two consecutive blocks can actually be implemented substantially in parallel, and sometimes can be implemented in a reverse order, depending on the involved functions. It should also be noted that each block in the block diagram and/or flow chart as well as a combination of blocks in the block diagram and/or flow chart may be implemented by a special-purpose hardware-based system for implementing the specified functions or operations, or by a combination of special-purpose hardware and computer instructions.

Figure 8:
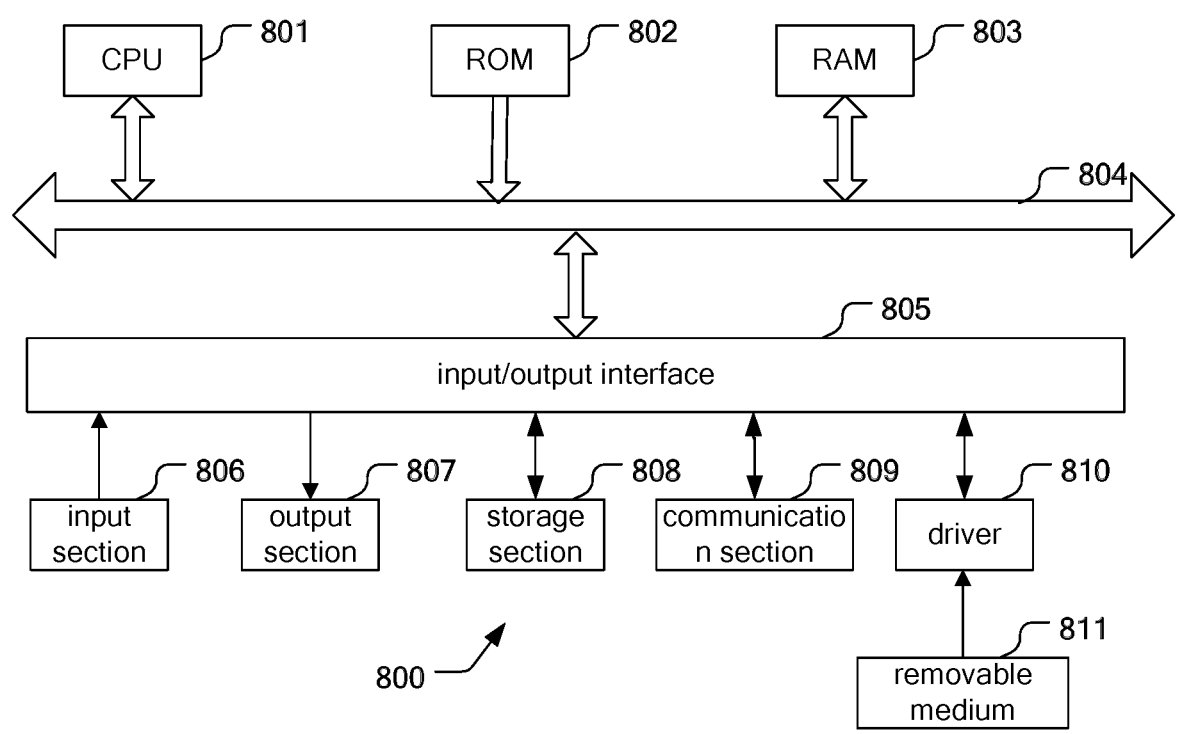
FIG. 8 is a block diagram illustrating an exemplary structure capable of implementing a computer of the present invention.

FIG. 8 is a block diagram illustrating an exemplary structure capable of implementing a computer of the present invention. In FIG. 8, a central processing unit (CPU) 801 performs various processes according to program stored in an ROM 802 or program loaded from a storage section 808 onto an RAM 803. In RAM 803, data required for CPU 801 performing various processes may also be stored as appropriate.

CPU 801, ROM 802 and RAM 803 are connected to one another via a bus 804. An input/output interface 805 is also connected to the bus 804.

The following components are connected to the input/output interface 805, i.e., an input section 806 including a keyboard, a mouse, etc.; an output section 807 including a display, such as a CRT, an LCD, and a loudspeaker, etc.; a storage section 808 including a hard disk, etc.; and a communication section 809 including a network interface card, such as a LAN card, a modem, etc. The communication section 809 performs communication process via e.g. internet.

A driver 810 is also connected to the input/output interface 805 as appropriate. Removable media 811 such as a disc, an optical disc, a magneto-optical disk, a semiconductor memory, etc. are installed on the driver 810 as appropriate, so that computer programs read therefrom are installed into the storage section 808 as appropriate.

In case of implementing the above steps and processes through software, programs of the software are installed from a network such as internet or a storage medium such as the removable media 811.

Those skilled in the art should understand that such storage media are not limited to the removable media 811 storing programs therein and distributed separately from the device to provide the user with programs. Examples of the removable media 811 comprise disk, optical disk (including CD-ROM and DVD), magneto-optical disk (including MD) and semiconductor memory. Or, storage media may be ROM 802, a hard disk included in the storage section 808, etc. It has program stored therein, and is distributed to the user together with the device including it.

According to the embodiment of the present disclosure, the base station may be implemented to be e.g. in any type of eNB, such as macro eNB and micro eNB. The micro eNB can cover eNB of a cell that is smaller than a macro cell, such as micromicro eNB, micro eNB and home (femto) eNB. Alternatively, the base station may be implemented to be in any other type of base station, such as NodeB and BTS. The base station may include: a main body (which is also called base station device) configured to control wireless communication; and one or more remote wireless head end (RRH) disposed in a location different from that of the main body, wherein, as the development of Centralized, Cooperative, Cloud RAN (C-RAN), the aforementioned main body for controlling wireless communication may also be a cloud baseband processing device, e.g., a server. In addition, various types of terminals to be described below may function as base stations by implementing the functions of the base stations temporarily or semipersistently.

The user equipment according to the present disclosure can be e.g. implemented as a mobile terminal (such as a smart phone, a tablet PC, a notebook PC, a smart wearable device, a portable game terminal, a portable/FreeEIM type mobile router, and a digital camera device) or a vehicle-mounted terminal (such as automobile navigation equipment). The user equipment may also be implemented as a terminal for implementing Machine-to-Machine (M2M) communication (which is also called a machine type communication (MTC) terminal). In addition, the user equipment may be a wireless communication module (such as an integrated circuit module including a single chip) installed on each of the above terminals.

An application example of a base station and user equipment will be described in connection with FIGS. 9 to 11.

Figure 9:
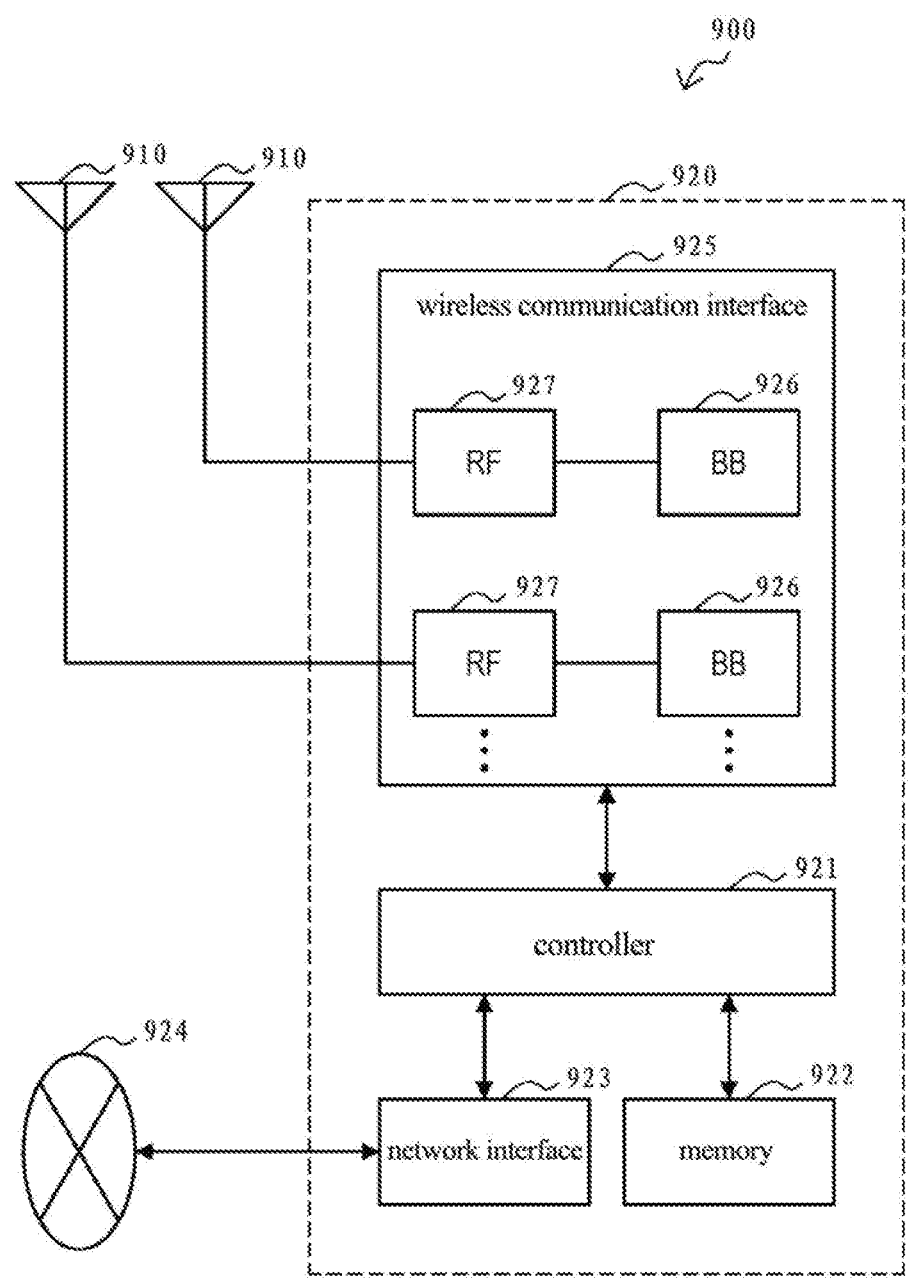
FIG. 9 is a block diagram illustrating a first example of schematic configurations of the eNB to which the technology of the present disclosure may be applied.

FIG. 9 is a block diagram illustrating a first example of schematic configurations of the eNB to which the technology of the present disclosure may be applied. eNB 900 includes one or more antennas 910 and base station device 920. The base station device 920 and each antenna 910 are connected to each other via RF cables.

Each of the antennas 910 comprises single or multiple antenna elements (such as a plurality of antenna elements included in the MIMO antenna), and is used for transmitting and receiving wireless signals for the base station device 920. As shown in FIG. 9, eNB 900 may include a plurality of antennas 910. For example, the plurality of antennas 910 may be compatible with a plurality of frequency bands used by eNB 900. Although FIG. 9 shows therein an example that the eNB 900 comprises a plurality of antennas 910, eNB 900 may also include a single antenna 910.

The base station device 920 comprises a controller 921, a memory 922, a network interface 923 and a wireless communication interface 925.

The controller 921 may be e.g. CPU or DSP, and performs various functions of higher layers of the base station device 920. For example, the controller 921 generates a data packet based on data in the signals processed by the wireless communication interface 925, and transmits the generated packet via the network interface 923. The controller 921 can bind data from a plurality of baseband processors to generate a binding packet, and transmit the generated binding packet. The controller 921 may have logic functions for executing the controls such as radio resource control, radio bearer control, mobility management, admission control and scheduling. The controls can be implemented in combination with neighboring eNB or core network. The memory 922 comprises RAM and ROM, and stores programs executed by the controller 921 and various types of control data (such as a terminal list, transmission power data and scheduling data).

The network interface 923 is a communication interface for connecting the base station device 920 to a core network 924. The controller 921 may communicate with the core network node or another eNB via the network interface 923. In this case, eNB 900 and the core network node or other eNB can be connected to each other through a logic interface (such as an S1 interface and an X2 interface). The network interface 923 may also be a wired communication interface or a wireless communication interface for a wireless backhaul line. If the network interface 923 is a wireless communication interface, the network interface 923 may use a higher frequency band for wireless communication compared with the frequency band used by the wireless communication interface 925.

The wireless communication interface 925 supports any cellular communication schemes (such as LTE and LTE-advanced), and provides to wireless communication located in a terminal of a cell in eNB 900 via the antennas 910. The wireless communication interface 925 may usually comprise e.g. a baseband (BB) processor 926 and an RF circuit 927. The BB processor 926 may perform e.g. encoding/decoding, modulation/demodulation and multiplexing/demultiplexing, and perform all types of signal processing for the layers (for example, L1, media access control (MAC), radio link control (RLC) and packet data convergence protocol (PDCP)). The BB processor 926, in place of the controller 921, may have a part of or all of the above logic functions. The BB processor 926 may be a memory for storing communication control programs, or a module comprising a processor configured to execute programs and related circuits. Updating the programs may change the functions of the BB processor 926. The module may be a card or a blade inserted into a slot of the base station device 920. Alternatively, the module may also be a chip mounted on a card or a blade. Meanwhile, the RF circuit 927 may comprise e.g. a frequency mixer, a filter and an amplifier, and transmit and receive an antenna signal via the antennas 910.

As shown in FIG. 9, the wireless communication interface 925 may comprise a plurality of BB processors 926. For example, the plurality of BB processors 926 may be compatible with a plurality of frequency bands used by eNB 900. As shown in FIG. 9, the wireless communication interface 925 may comprise a plurality of RF circuits 927. For example, the plurality of RF circuits 927 may be compatible with the plurality of antenna elements. Although FIG. 9 shows therein an example that the wireless communication interface 925 comprises a plurality of BB processors 926 and a plurality of RF circuits 927, the wireless communication interface 925 may also include a single BB processor 926 or a single RF circuit 927.

Figure 10:
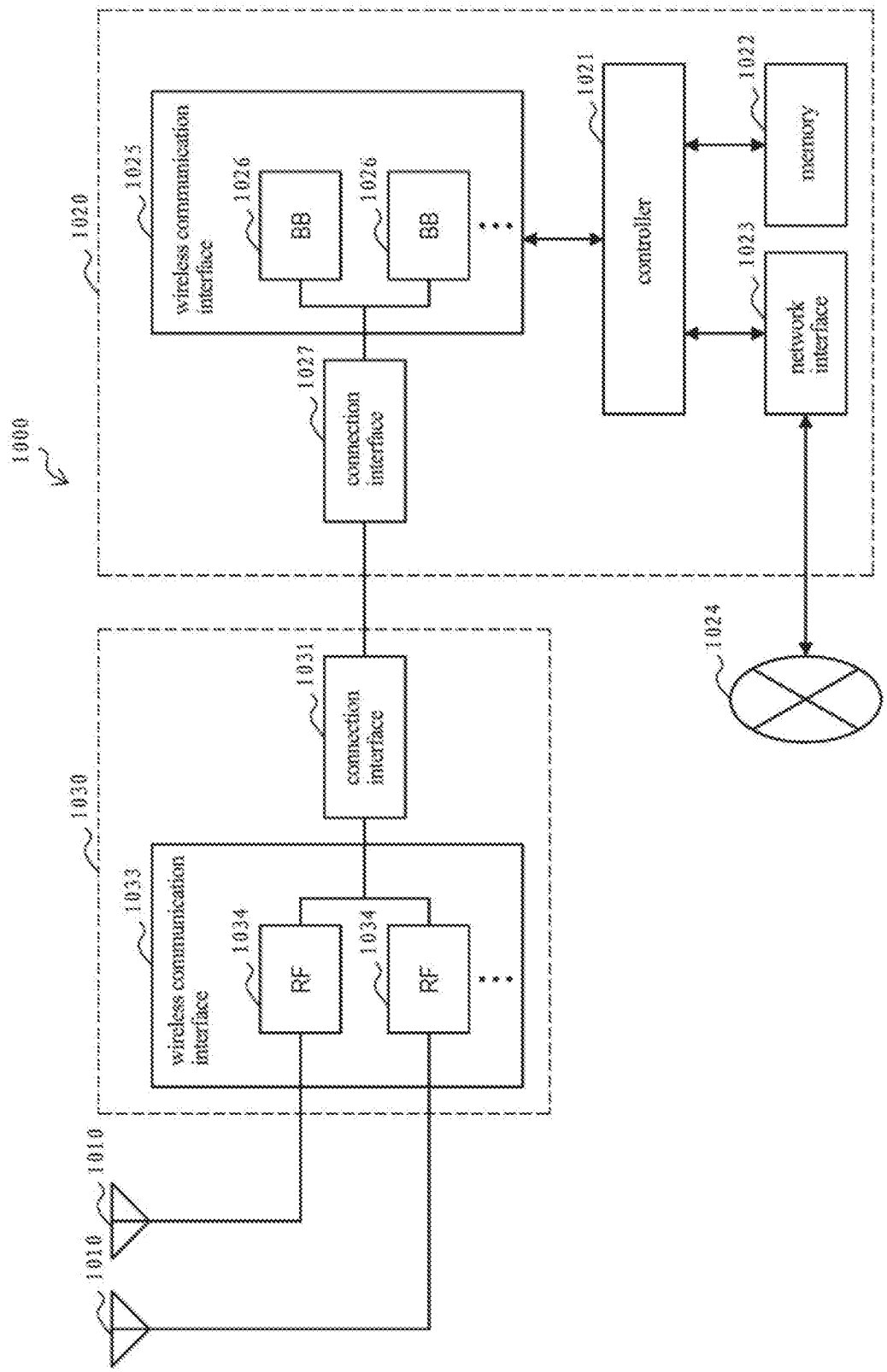
FIG. 10 is a block diagram illustrating a second example of schematic configurations of the eNB to which the technology of the present disclosure may be applied.

FIG. 10 is a block diagram illustrating a second example of schematic configurations of the eNB to which the technology of the present disclosure may be applied. eNB 1000 comprises one or more antennas 1010, base station device 1020 and RRH 1030. RRH 1030 and each antenna 1010 can be connected to each other via RF cables. Base station device 1020 and RRH 1030 can be connected to each other via a high speed line such as optical fiber cable.

Each of antennas 1010 comprises single or multiple antenna elements (such as a plurality of antenna elements included in the MIMO antenna) and is used for transmitting and receiving wireless signals for RRH 1030. As shown in FIG. 10, eNB 1000 may comprise a plurality of antennas 1010. For example, the plurality of antennas 1010 may be compatible with a plurality of frequency bands used by eNB 1000. Although FIG. 10 shows therein an example that the eNB 1000 comprises a plurality of antennas 1010, eNB 1000 may also include a single antenna 1010.

The base station device 1020 comprises a controller 1021, a memory 1022, a network interface 1023, a wireless communication interface 2015 and a connection interface 1027. The controller 1021, the memory 1022 and the network interface 1023 are identical to the controller 921, the memory 922 and the network interface 923 as described with reference to FIG. 9. The network interface 1023 is used for connecting the base station device 1020 to a core network 1024.

The wireless communication interface 1025 supports any cellular communication schemes (such as LTE and LTE-advanced), and provides wireless communication to a terminal located in a sector corresponding to RRH 1030 via the RRH 1030 and the antenna 1010. The wireless communication interface 1025 may usually comprise e.g. a BB processor 1026. The BB processor 1026 is the same as the BB processor 926 as described with reference to FIG. 9, except that the BB processor 1026 is connected to the RF circuit 1034 of the RRH 1030 via the connection interface 1027. As shown in FIG. 10, the wireless communication interface 1025 may comprise a plurality of BB processors 1026. For example, the plurality of BB processors 1026 may be compatible with a plurality of frequency bands used by eNB 1000. Although FIG. 10 shows therein an example that the wireless communication interface 1025 comprises a plurality of BB processors 1026, the wireless communication interface 1025 may also include a single BB processor 1026.

The connection interface 1027 is an interface for connecting the base station device 1020 (the wireless communication interface 1025) to the RRH 1030. The connection interface 1027 may also be a communication module for connecting the base station device 1020 (the wireless communication interface 1025) to communication in the above high speed line of the RRH 1030.

The RRH 1030 comprises a connection interface 1031 and a wireless communication interface 1033.

The connection interface 1031 is an interface for connecting the RRH 1030 (the wireless communication interface 1033) to the base station device 1020. The connection interface 1031 may also be a communication module for the communication in the above high speed line.

The wireless communication interface 1033 transmits and receives wireless signals via the antennas 1010. The wireless communication interface 1033 may usually comprise e.g. an RF circuit 1034. The RF circuit 1034 may include e.g. a frequency mixer, a filter and an amplifier, and transmit and receive wireless signals via the antennas 1010. As shown in FIG. 10, the wireless communication interface 1033 may comprise a plurality of RF circuits 1034. For example, the plurality of RF circuits 1034 may support the plurality of antenna elements. Although FIG. 10 shows an example in which the wireless communication interface 1033 comprises a plurality of RF circuits 1034, the wireless communication interface 1033 may also include a single RF circuit 1034.

In the eNB 900 and eNB 1000 as shown in FIGS. 9 and 10, the transmissions performed in operations T1 and T7 as described in the example of FIG. 6 and the function of the receiving unit 701 as described in the example of FIG. 7 can be implemented by the wireless communication interface 925 and the wireless communication interface 1025 and/or the wireless communication interface 1033. At least a part of the functions may also be implemented by the controllers 921 and 1021. For example, the device 100 implemented in the example of FIG. 1 can perform the function of the matching unit 101 and the channel characteristic determining unit 102 through the controller 921 or the controller 1021. In addition, the functions of various units of the devices 200-400 implemented in the examples of FIGS. 2 to 4 respectively may also be performed by the controller 921 or the controller 1021. In addition, the function of the generating unit 702 of the reference vector generating unit 700 implemented by the example of FIG. 7 may also be performed by the controller 921 or the controller 1021.

Figure 11:
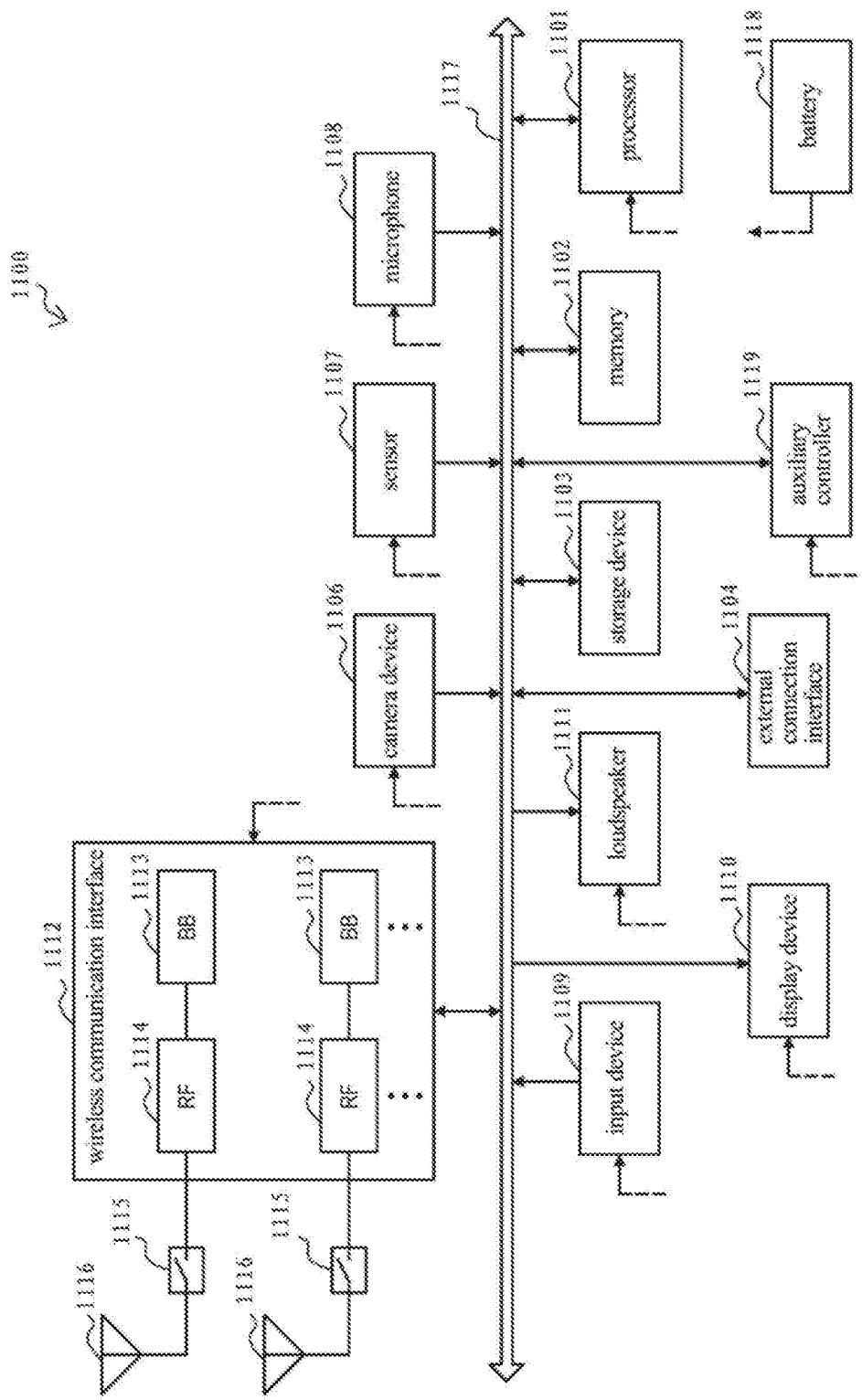
FIG. 11 is a block diagram illustrating schematic configurations of a smart phone to which the technology of the present disclosure may be applied.

FIG. 11 is a block diagram illustrating schematic configurations of a smart phone 1100 to which the technology of the present disclosure may be applied. The smart phone 1100 comprises a processor 1011, a memory 1102, a storage device 1103, an external connection interface 1104, a camera device 1106, a sensor 1107, a microphone 1108, an input device 1109, a display device 1110, a loudspeaker 1111, a wireless communication interface 1112, one or more antenna switches 1115, one or more antennas 1116, a bus 1117, a battery 1118 and an auxiliary controller 1119.

The processor 1101 may be e.g. CPU or System on Chip (SoC), and control the functions of an application layer and other layers of the smart phone. The memory 1102 comprises RAM and ROM, and stores data and programs executed by the processor 1101. The storage device 1103 may comprise a storage medium, such as a semiconductor memory and a hard disk. The external connection interface 1104 is an interface for connecting an external device (such as a memory card and a USB device) to the smart phone 1100.

The camera device 1106 comprises an image sensor (such as a CCD and a CMOS), and generates a captured image. The sensor 1107 may comprise a set of sensors, such as measuring sensors, gyro sensors, geomagnetic sensors and acceleration sensors. The microphone 1108 converts a voice inputted into the smart phone 1100 into an audio signal. The input device 1109 comprises e.g. a touch sensor, a keypad, a keyboard, a button or a switch configured to detect a touch on a screen of the display device 1110, and receives input operation or information from the user. The display device 1110 comprises the screen (such as an LCD and an OLED display), and displays an image outputted from the smart phone 1100. The loudspeaker 1111 converts the audio signal outputted from the smart phone 1100 into sound.

The wireless communication interface 1112 supports any cellular communication schemes (such as LTE and LTE-advanced), and performs wireless communication. The wireless communication interface 1112 may usually comprise e.g. a BB processor 1113 and an RF circuit 1114. The BB processor 1113 may perform e.g. encoding/decoding, modulation/demodulation and multiplexing/demultiplexing, and perform all types of signal processing for wireless communications. Meanwhile, the RF circuit 1114 may comprise e.g. a frequency mixer, a filter and an amplifier, and transmit and receive a radio signal via the antenna 1116. The wireless communication interface 1112 may be a chip module having the BB processor 1113 and the RF circuit 1114 integrated thereon. As shown in FIG. 11, the wireless communication interface 1112 may comprise a plurality of BB processors 1113 and a plurality of RF circuits 1114. Although FIG. 11 shows an example in which the wireless communication interface 1112 comprises a plurality of BB processors 1113 and a plurality of RF circuits 1114, the wireless communication interface 1112 may also include a single BB processor 1113 or a single RF circuit 1114.

Besides, in addition to the cellular communication scheme, the wireless communication interface 1112 may support other types of wireless communication schemes, such as a short-range wireless communication scheme, a near field communication scheme, and a wireless LAN scheme. In this case, the wireless communication interface 1112 may comprise a BB processor 1113 and an RF circuit 1114 for each type of wireless communication scheme.

Each of the antenna switches 1115 switches connection destinations of the antennas 1116 among a plurality of circuits included in the wireless communication interface 1112 (e.g., the circuit for different wireless communication schemes).

Each of the antennas 1116 comprises single or multiple antenna elements (such as a plurality of antenna elements included in the MIMO antenna), and is used for transmitting and receiving wireless signals for the wireless communication interface 1112. As shown in FIG. 11, the smart phone 1100 may include a plurality of antennas 1116. Although FIG. 11 shows an example in which the smart phone 1100 comprises a plurality of antennas 1116, the smart phone 1100 may also include a single antenna 1116.

Besides, the smart phone 1100 may comprise antennas 1116 for each type of wireless communication scheme. In this case, the antenna switches 1115 may be omitted from the configurations of the smart phone 1100.

The bus 1117 is used for connecting the processor 1101, the memory 1102, the storage device 1103, the external connection interface 1104, the camera device 1106, the sensor 1107, the microphone 1108, the input device 1109, the display device 1110, the loudspeaker 1111, the wireless communication interface 1112, and an auxiliary controller 1119 with one another. The battery 1118 provides an electric power for each block of the smart phone 1100 as shown in FIG. 11 via feeding lines. The feeding lines are partially illustrated as dotted lines in the figure. The auxiliary controller 1119 performs the minimum required function of the smart phone 1100 in a sleep mode.

In a Device-to-Device scenario, for example, for the smart phone 1100 as shown in FIG. 11, the transmissions performed in operations T1 and T7 as described in the example of FIG. 6 and the function of the receiving unit 701 as described in the example of FIG. 7 can be implemented by the wireless communication interface 1112. At least a part of the functions may also be implemented by the controllers 1101 or the auxiliary controller 1119, respectively. For example, the device 100 implemented in the example of FIG. 1 can perform the function of the matching unit 101 and the channel characteristic determining unit 102 through the processor 1101 or the auxiliary controller 1119. In addition, the functions of various units of the devices 200-400 implemented in the examples of FIGS. 2 to 4 respectively may also be performed by the processor 1101 or the auxiliary controller 1119. In addition, the function of the generating unit 702 of the reference vector generating unit 700 implemented in the example of FIG. 7 may also be performed by the processor 1101 or the auxiliary controller 1119.

It should be understood that the terms used in the disclosure are only aim to describe the specific embodiments, but not intended to limit the present invention. The wordings "one" or "the" in a singular form used in the disclosure are intended to comprise a plural form, unless specified otherwise in the context. It should also be known that the wording "comprise" used in the description indicates that the specified feature, integer, step, operation, unit and/or component are present, without excluding the presence or adding of one or more other features, integers, steps, operations, units and/or components, as well as/or a combination thereof.

The present invention is described with reference to the specific embodiments in the foregoing description. However, those skilled in the art could understand that various modifications and changes may be made without departing from the scope of the present invention as defined by the appended claims.

The exemplary embodiments are described in the following:

1. A device for use in a Multi-Input Multi-Output (MIMO) wireless communication system, comprising:

a matching unit configured to determine a matching degree of channel estimation information of a communication device to be scheduled with one or more reference vectors included in a reference vector group, wherein the reference vector group depends on an antenna array configuration of the MIMO wireless communication system; and a channel characteristic determining unit configured to determine correlation information of the one or more reference vectors with the matching degree satisfying a predetermined condition as one or more parameters reflecting channel characteristic(s) associated with the communication device.

2. The device according to embodiment 1, wherein, the channel characteristic determining unit is configured to determine one or more reference vectors with the matching degree being greater than a predetermined threshold, as one or more representative vectors of the communication device for specific transmission resources, and the one or more parameters reflecting the channel characteristic(s) associated with the communication device comprises the representative vector(s).

3. The device according to embodiment 1, further comprising a communication device scheduling unit configured to schedule, based on the channel characteristics associated with a plurality of communication devices to be scheduled, one or more of the plurality of communication devices.

4. The device according to embodiment 3, wherein, the communication device scheduling unit is configured to schedule, for specific transmission resources, the ones among the plurality of communication devices whose differences in channel characteristics between each other satisfy a predetermined condition to perform transmission.

5. The device according to embodiment 1, further comprising a pre-encoding unit configured to pre-encode, for a plurality of communication devices which are simultaneously scheduled, transmission data of the scheduled communication devices based on channel characteristics associated with the plurality of communication devices.

6. The device according to embodiment 1, wherein, the reference vector group comprises a plurality of reference vectors orthogonal to one another, the plurality of reference vectors corresponding to a plurality of virtual channel vectors of the antenna array which are orthogonal to one another.

7. The device according to embodiment 1, wherein, the reference vector group comprises a plurality of reference vectors, wherein, the plurality of reference vectors correspond to virtual channel vectors of the antenna array in a plurality of maximum antenna gain directions.

8. The device according to embodiment 2, wherein,
the communication device scheduling unit is configured to schedule communication devices having no identical representative vector or having relatively less identical representative vectors to perform transmission on the specific transmission resources.

9. The device according to embodiment 2, further comprising a pre-encoding matrix generating unit configured to calculate, in a case where the communication device scheduling unit schedules communication devices having identical representative vectors to perform transmission on the specific transmission resources, a pre-encoding matrix for the communication devices having identical representative vectors based on the channel characteristics, to reduce interference on the communication devices having identical representative vectors.

10. The device according to embodiment 2, wherein, the predetermined threshold is set in association with at least one of a channel gain, a scheduling requirement for each communication device to be scheduled, and a fairness principle.

11. The device according to embodiment 1, wherein, the channel estimation information is long-term channel statistical information or channel state information.

12. A wireless communication method for a Multi-Input Multi-Output (MIMO) wireless communication system, the method comprising:
determining a matching degree of channel estimation information of a communication device to be scheduled with one or more reference vectors included in a reference vector group, wherein the reference vector group depends on an antenna array configuration of the MIMO wireless communication system; and
determining correlation information of one or more reference vectors with the matching degree satisfying a predetermined condition as one or more parameters reflecting channel characteristic(s) associated with the communication device.

13. A device for use in a Multi-Input Multi-Output (MIMO) wireless communication system, comprising:
a receiving unit configured to receive configuration information of an antenna array; and
a generating unit configured to generate a reference vector group based on the configuration information.

14. The device according to embodiment 13, wherein, any two of reference vectors in the reference vector group are orthogonal to each other.

15. The device according to embodiment 14, wherein, the generating unit generates the reference vector group based at least on antenna number information in the configuration information.

16. The device according to embodiment 15, wherein, a dimension number of the reference vectors in the reference vector group is equal to the antenna number.

17. The device according to embodiment 15, wherein, the generating unit generates the reference vector group further based on information on a geometrical shape of the antenna array in the configuration information.

18. A device for use in a Multi-Input Multi-Output (MIMO) wireless communication system, comprising:
one or more processors configured to implement a method comprising:
determining a matching degree of channel estimation information of a communication device to be scheduled with one or more reference vectors included in a reference vector group, wherein the reference vector group depends on an antenna array configuration of the MIMO wireless communication system; and
determining correlation information of one or more reference vectors with the matching degree satisfying a predetermined condition, as one or more parameters reflecting channel characteristic(s) associated with the communication device.

19. A device for use in a Multi-Input Multi-Output MIMO wireless communication system, comprising:
one or more processors configured to implement a method comprising:
acquiring configuration information of an antenna array; and
generating a reference vector group based on the configuration information.

20. A non-transitory computer readable storage device having instructions stored therein that when executed by processing circuitry perform a communications method, the method comprising:
determining a matching degree of channel estimation information of a communication device to be scheduled with one or more reference vectors included in a reference vector group, wherein the reference vector group depends on an antenna array configuration of the MIMO wireless communication system; and
determining correlation information of one or more reference vectors with the matching degree satisfying a predetermined condition, as one or more parameters reflecting channel characteristic(s) associated with the communication device.

What is claimed is:
1. A communication device for use in a wireless communication system, comprising:
circuitry configured to
receive a reference signal from a base station to determine a channel between the communication device and the base station;
determine a reference direction satisfying a predetermined condition as a representative direction of the channel;
determine one or more parameters reflecting channel characteristic(s) associated with the communication device, the one or more parameters including identity of the representative direction; and
acquire scheduling information from the base station for data transmission through the channel on specific transmission resources,
wherein Multi-User Multi-Input Multi-Output MU-MIMO is supported, a precoding matrix is calculated based on the channel characteristic(s), to reduce interference by other communication device having identical representative direction on the specific transmission resources in MU-MIMO.

2. The communication device according to claim 1, wherein
the circuitry is further configured to determine a matching degree of the channel with one or more reference directions based on the channel, the matching degree is determined according to channel gain with respective reference direction.

3. The communication device according to claim 1, wherein
the reference directions are relevant to an antenna array configuration of the wireless communication system.

4. The communication device according to claim 1, wherein the circuitry is configured to search the reference directions one by one to determine the representative direction for the communication device.

5. The communication device according to claim 4, wherein the circuitry is configured to determine multiple reference directions satisfying the predetermined condition as representative directions.

6. The communication device according to claim 3, wherein the circuitry is configured to receive the antenna array configuration from the base station for determining the reference directions, the antenna array configuration at least comprises antenna number.

7. The communication device according to claim 1, wherein the precoding matrix is calculated based on the channel characteristics of the communication device and the other communication device with zero-forcing algorithm.

8. The communication device according to claim 1, wherein each reference direction corresponds to a DFT vector.

9. The communication device according to claim 1, wherein the communication device is implemented as a user equipment.

10. A communication method for use in a wireless communication system, comprising:
receiving a reference signal from a base station to determine a channel between the communication device and the base station;
determining a reference direction satisfying a predetermined condition as a representative direction of the channel;
determining one or more parameters reflecting channel characteristic(s) associated with the communication device, the one or more parameters including identity of the representative direction; and
acquiring scheduling information from the base station for data transmission through the channel on specific transmission resources,
wherein Multi-User Multi-Input Multi-Output MU-MIMO is supported, a precoding matrix is calculated based on the channel characteristic(s), to reduce interference by other communication device having identical representative direction on the specific transmission resources in MU-MIMO.

11. The communication method according to claim 10, further comprising
determining a matching degree of the channel with one or more reference directions based on the reference signal, and wherein
the matching degree is determined according to channel gain with respective reference direction.

12. The communication method according to claim 10, wherein
the reference directions are relevant to an antenna array configuration of the wireless communication system, the method comprises receiving the antenna array configuration from the base station for determining the reference directions, the antenna array configuration at least comprises antenna number.

13. The communication method according to claim 10, wherein the method comprises searching the reference directions one by one to determine the representative direction for the communication device.

14. The communication method according to claim 13, wherein the method comprises determining multiple reference directions satisfying the predetermined condition as representative directions.

15. The communication method according to claim 10, wherein the precoding matrix is calculated based on the channel characteristics of the communication device and the other communication device with zero-forcing algorithm.

16. The communication method according to claim 10, wherein each reference direction corresponds to a DFT vector.

17. A communication device for use in a wireless communication system, comprising:
circuitry configured to
receive a reference signal from a base station to determine a channel between the communication device and the base station;
determine a reference direction satisfying a predetermined condition as a representative direction of the channel;
determine one or more parameters reflecting channel characteristic(s) associated with the communication device, the one or more parameters including identity of the representative direction; and
acquire scheduling information from the base station for data transmission through the channel on specific transmission resources,
wherein Multi-User Multi-Input Multi-Output MU-MIMO is supported, the specific transmission resources are avoided to be scheduled to other communication device having identical representative direction.

18. A communication device for use in a wireless communication system, comprising:
circuitry configured to
receive a reference signal from a base station to determine a channel between the communication device and the base station;
determine one or more reference vectors satisfying a predetermined condition as one or more representative vectors of the channel;
determine one or more parameters reflecting channel characteristic(s) associated with the communication device, the one or more parameters including the representative vectors or identity of the representative vectors; and
acquire scheduling information from the base station for data transmission through the channel on specific transmission resources,
wherein Multi-User Multi-Input Multi-Output MU-MIMO is supported, a precoding matrix is calculated based on the channel characteristic(s), to reduce interference by other communication device having identical representative vectors on the specific transmission resources in MU-MIMO.

19. A communication device for use in a wireless communication system, comprising:
circuitry configured to
receive a reference signal from a base station to determine a channel between the communication device and the base station;

determine one or more reference vectors satisfying a predetermined condition as one or more representative vectors of the channel;

determine one or more parameters reflecting channel characteristic(s) associated with the communication device, the one or more parameters including the representative vectors or identity of the representative vectors; and acquire scheduling information from the base station for data transmission through the channel on specific transmission resources, wherein Multi-User Multi-Input Multi-Output MU-MIMO is supported, the specific transmission resources are avoided to be scheduled to other communication device having identical representative direction.

20. The communication device according to claim 19, wherein the communication device is implemented as a user equipment, the circuitry is configured to determine a covariance matrix of the channel and calculate a similarity degree of the spatial covariance matrix and the reference vectors as the matching degree.

\* \* \* \* \*